US011887010B2

(12) United States Patent
Moura et al.

(10) Patent No.: US 11,887,010 B2
(45) Date of Patent: *Jan. 30, 2024

(54) DATA CLASSIFICATION FOR DATA LAKE CATALOG

(71) Applicant: INTERNATIONAL BUSINESS MACHINES CORPORATION, Armonk, NY (US)

(72) Inventors: Marcio T. Moura, Wellington, FL (US); Qiqing C. Ouyang, Yorktown Heights, NY (US); Jo A. Ramos, Grapevine, TX (US); Deepak Rangarao, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1431 days.

This patent is subject to a terminal disclaimer.

(21) Appl. No.: 15/842,965

(22) Filed: Dec. 15, 2017

(65) Prior Publication Data

US 2019/0164063 A1    May 30, 2019

Related U.S. Application Data

(63) Continuation of application No. 15/823,771, filed on Nov. 28, 2017.

(51) Int. Cl.
*G06N 5/02* (2023.01)
*G06N 20/00* (2019.01)
(Continued)

(52) U.S. Cl.
CPC .......... *G06N 5/02* (2013.01); *G06F 16/90332* (2019.01); *G06F 16/90344* (2019.01); *G06N 20/00* (2019.01); *G06Q 10/067* (2013.01)

(58) Field of Classification Search
CPC ............................ G06N 5/02; G06Q 10/067
See application file for complete search history.

(56) References Cited

U.S. PATENT DOCUMENTS 6,564,202 B1    5/2003   Schuetze et al.
6,598,054 B2    7/2003   Schuetze et al.
(Continued)

OTHER PUBLICATIONS

Yaduwanshi, Himanshi, and Vijaya Padmadas. "Finding Similar Classes in Ontologies." Proceedings of the Second International Conference on Information and Communication Technology for Competitive Strategies. 2016. (Year: 2016).*

(Continued)

*Primary Examiner* — Kevin W Figueroa
(74) *Attorney, Agent, or Firm* — Rachel M. Yadlosky

(57) ABSTRACT

Data classification extracts from structured text business data inputs, via natural language understanding processing, training set data elements (training keywords, training concepts, training entities, and/or training taxonomy classifications). Embodiments identify associations within the structured training business data of business class categories with respective ones of extracted training set data elements, and build a logical relationship data classification training knowledge base ontology that connects business classes to (Continued)

respective associated ones of extracted training data elements as questions into knowledge base ontology question-business class associations.

8 Claims, 5 Drawing Sheets

(51) Int. Cl.
*G06F 16/9032* (2019.01)
*G06F 16/903* (2019.01)
*G06Q 10/067* (2023.01)

(56) References Cited

U.S. PATENT DOCUMENTS

| | | | |
|---|---|---|---|
| 6,915,254 | B1 | 7/2005 | Heinze et al. |
| 7,634,467 | B2 | 12/2009 | Ryan et al. |
| 7,657,506 | B2 | 2/2010 | Levin |
| 7,813,919 | B2 | 10/2010 | Goutte |
| 8,266,148 | B2 * | 9/2012 | Guha ............... G06F 16/9535 |
| | | | 707/741 |
| 8,731,966 | B2 | 5/2014 | Breitenstein et al. |
| 10,146,762 | B2 * | 12/2018 | Ghaisas ............... G06F 40/237 |
| 2015/0356404 | A1 * | 12/2015 | Sanchez ............... G06N 5/02 |
| | | | 706/12 |
| 2017/0177715 | A1 * | 6/2017 | Chang ............... G06N 5/04 |

OTHER PUBLICATIONS

Štajner, Tadej, and Dunja Mladenić. "Entity resolution in texts using statistical learning and ontologies." Asian Semantic Web Conference. Springer, Berlin, Heidelberg, 2009. (Year: 2009).*

Peter Mell et al, The NIST Definition of Cloud Computing, National Institute of Standards and Technology, Publication 800-145, 2011, entire document.

Marina Sokolova et al, A systematic analysis of performance measures for classification tasks, Information Processing and Management 45 (2009), Elsevier Ltd., pp. 427-437.

George Forman, A Pitfall and Solution in Multi-Class Feature Selection for Text Classification, Proceedings of the 21st International Conference on Machine Learning, Hewlett-Packard, 2004, entire document.

U.S. Appl. No. 15/823,771, filed Nov. 28, 2017; Confirmation No. 4082.

Moura et al., "Data Classification for Data Lake Catalog," U.S. Appl. No. 15/823,771, filed Nov. 28, 2017.

List of IBM Patents or Patent Applications Treated as Related, dated Oct. 3, 2023, 2 pages.

* cited by examiner

DATA CLASSIFICATION FOR DATA LAKE CATALOG

BACKGROUND

A data lake may be defined as a method of or process for storing data within a system or a set of fit per purpose repositories that facilitates the collection and management of data in different schemata and structural forms, enabling data processing for a variety of different workload, including transactional style point queries, aggregate queries and advanced analytics functions and algorithms. A data lake may function as a centralized data storage system that accommodates a wide variety of forms of data, including structured data from relational databases (for example, spreadsheet rows and columns), semi-structured data (for example, comma-separated values (CSV), data logs, and extensible mark-up language (XML) and JavaScript Object Notation (JSON) files), unstructured data (for example, email files, document files, Portable Document Format (PDF) files), and binary data (for example, image files, audio files, video files).

SUMMARY

In one aspect of the present invention, a computerized method for a data classifier includes executing steps on a computer processor. Thus, a computer processor is configured to extract from a structured text business data input, via natural language understanding processing, training set data elements that are selected from training keywords, training concepts, training entities, and training taxonomy classifications. The configured processor identifies associations within the structured training business data of each of a plurality of business class categories with respective ones of the extracted training set data elements; and builds a logical relationship data classification training knowledge base ontology that connects ones of the business classes to respective associated ones of the extracted training data elements as questions, into a plurality of knowledge base ontology question-business class associations.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
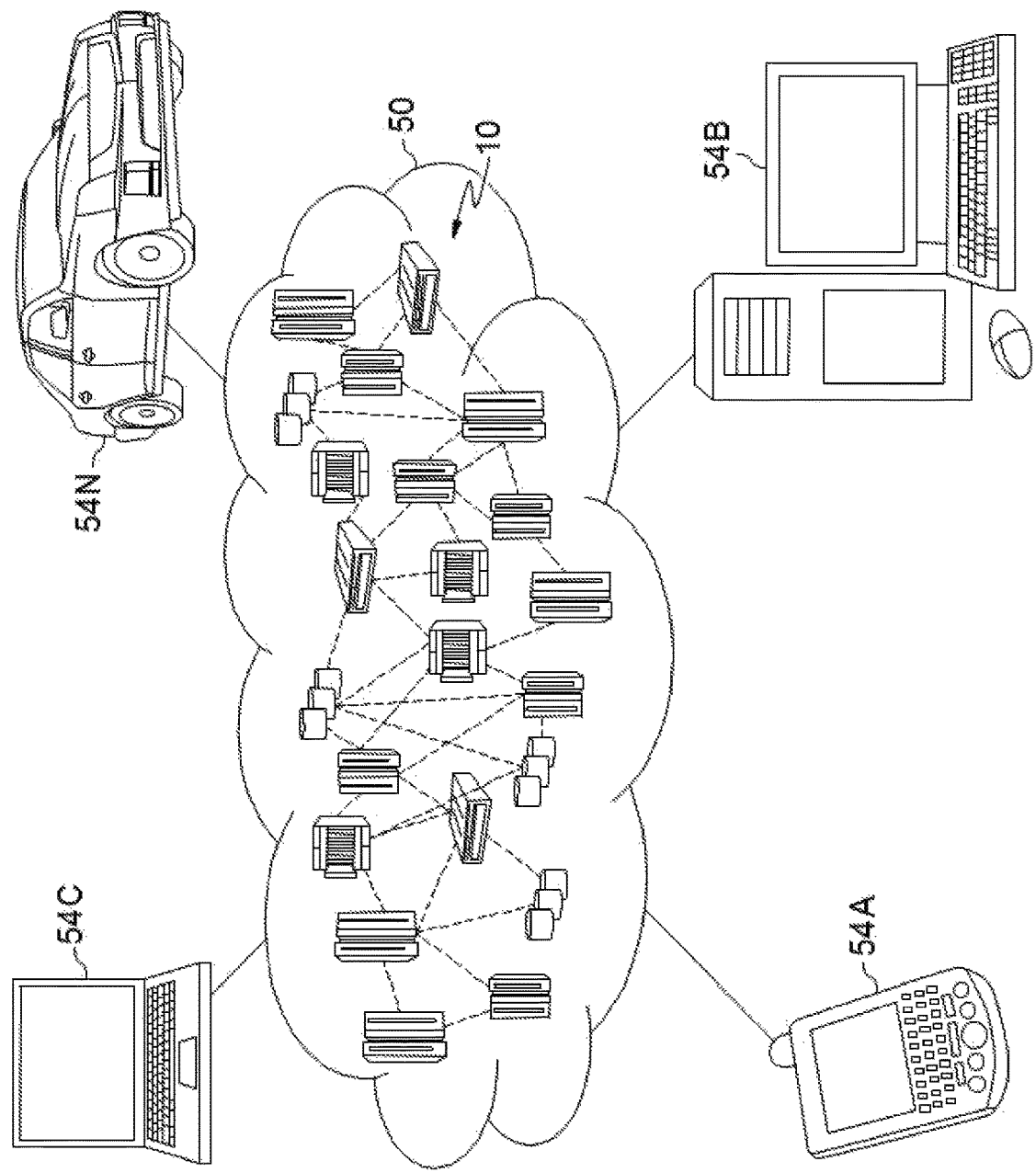
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
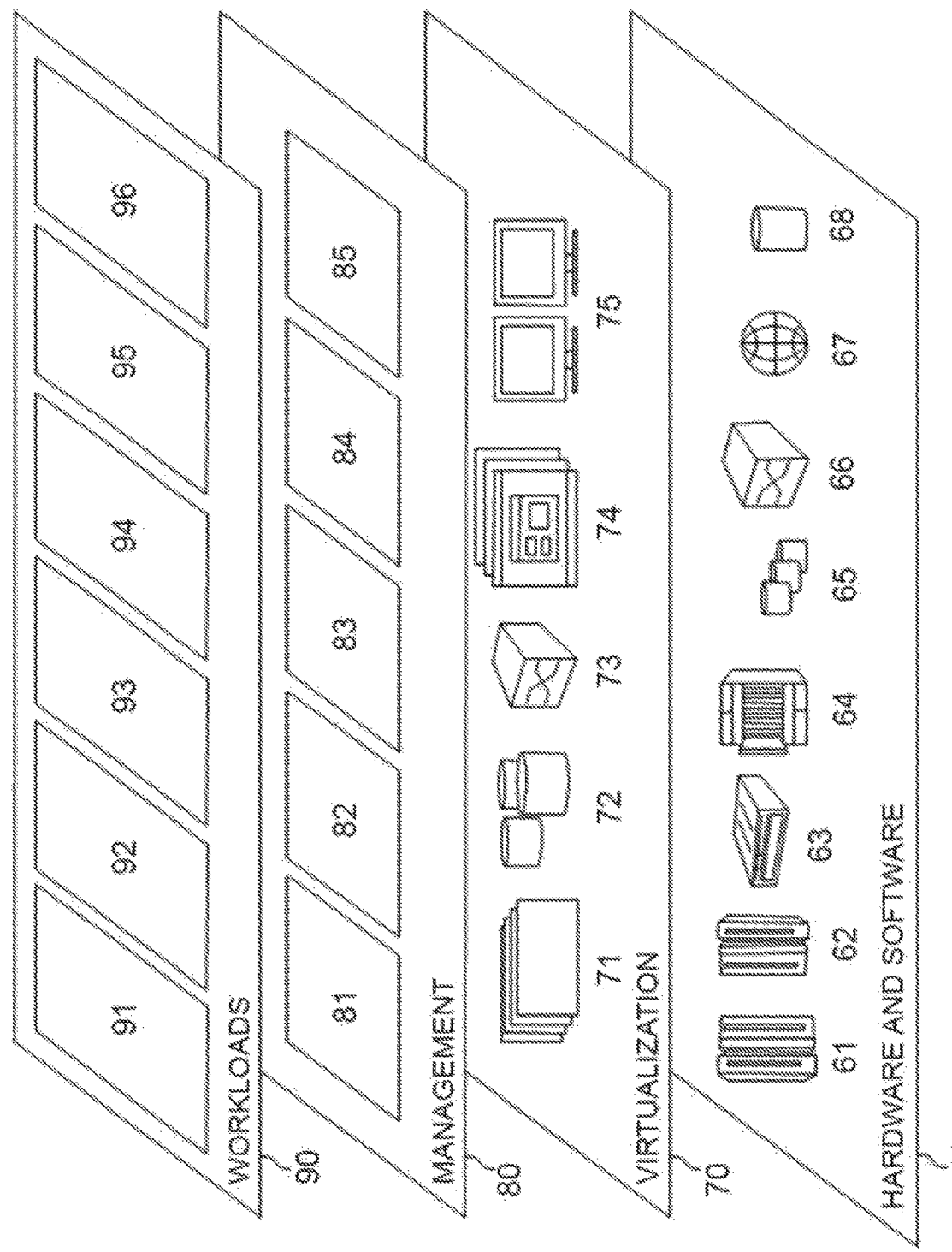
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a classifier according to aspects of the present invention 96.

Figure 3:
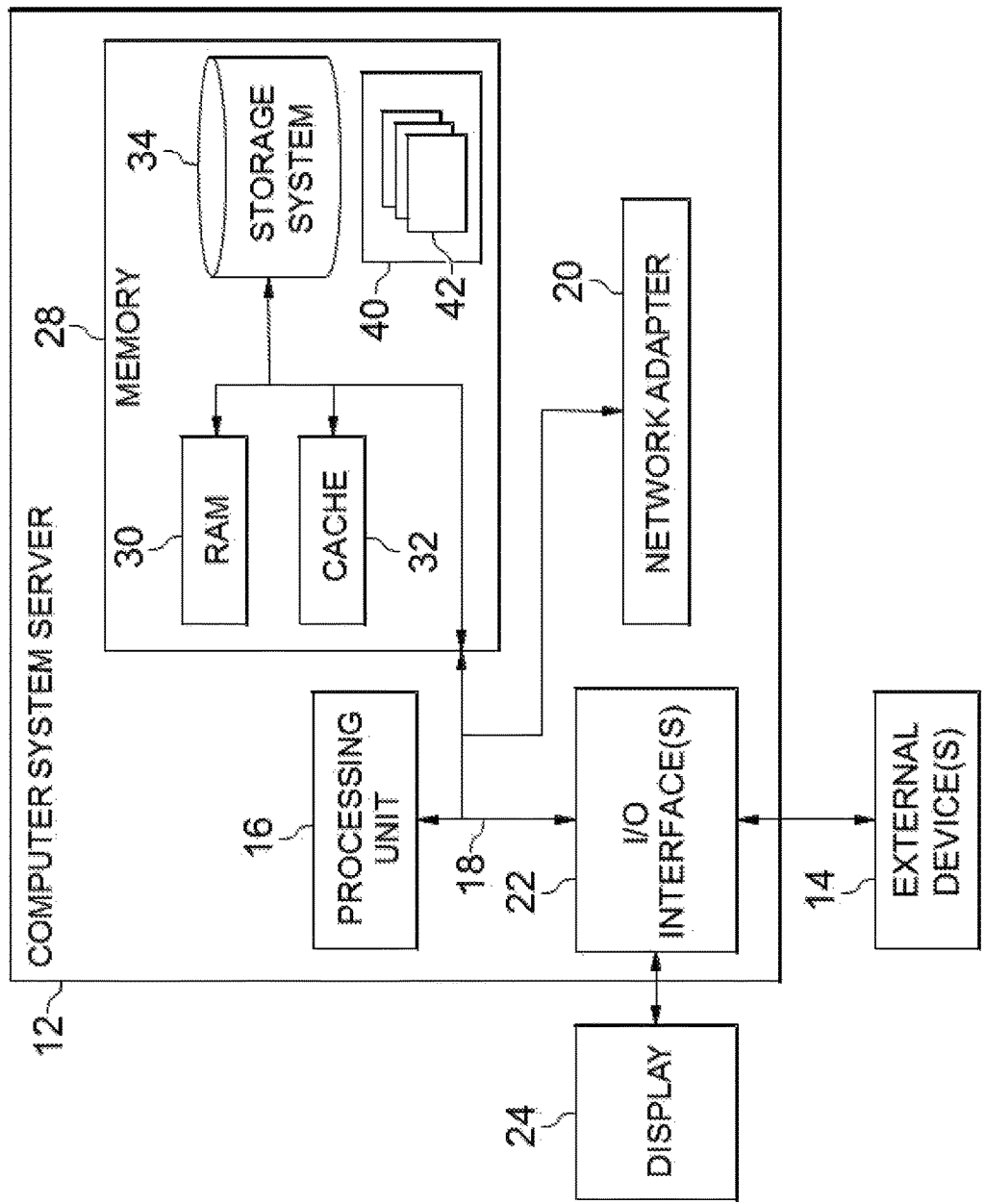
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
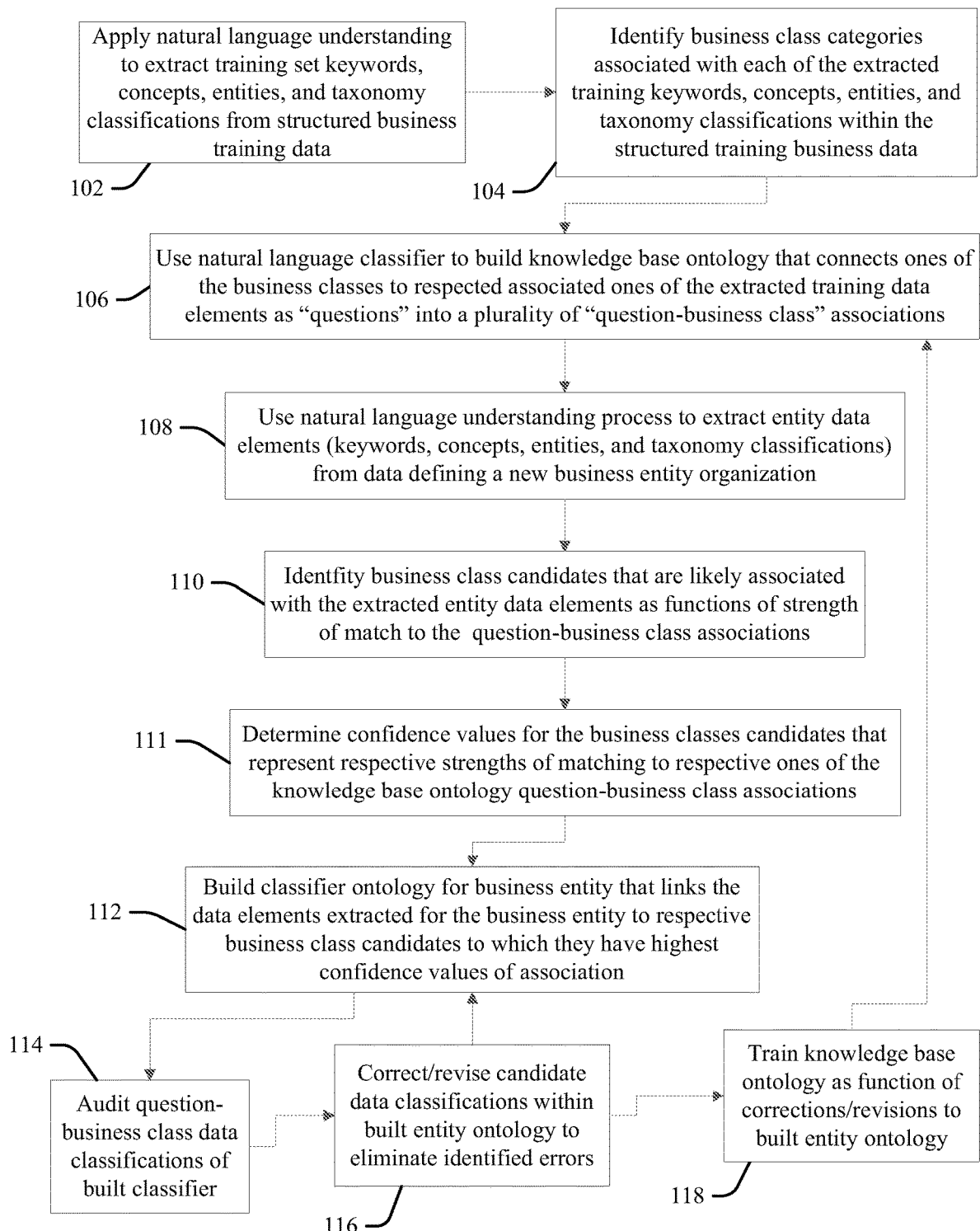
FIG. 4 is a flow chart illustration of an embodiment of the present invention.

FIG. 4 illustrates training a data classifier according to the present invention. At 102 a processor configured according to an aspect of the present invention (the "configured processor") executes (applies) a natural language understanding processes to extract (identify) training set data elements from a structured text business training data input, wherein the extracted training data elements comprehends keywords, concepts, entities, and taxonomy classifications.

At 104 the configured processor utilizes a natural language understanding processes to identify business class categories (business classes) that are associated with each of the extracted training data elements within the structured business training data.

At 106 the configured processor utilizes natural language classifier process to build a logical relationship data classification knowledge base ontology (graph, logic tree, etc.) that connects ones of the identified business classes to respected ones of the extracted training data elements identified at 104 as "questions," into a plurality of "question-business class" associations.

At 108 the configured processor uses a natural language understanding process to extract entity data elements (keywords, entity concepts, constituent entities, and entity taxonomy classifications) from a new business data input that defines an organizational attribute of a new business entity, wherein the new entity business data input may comprehend (include) one or more of structured, semi-structured and unstructured text data.

At 110 the configured processor uses a natural language understanding process to identify candidates of the business classes that are likely associated with each of the entity data elements extracted for the new business entity (the new business entity keywords, concepts, constituent entities, and taxonomy classifications) as a function of strengths of comparison (matching) to the question-business class associations defining the knowledge base ontology.

At 111 the configured processor uses a natural language classifier to determine confidence values for each of the business classes candidates that represent respective strengths of matching to respective ones of the knowledge base ontology question-business class associations.

At 112 the configured processor uses a natural language classifier to determine and provide classification recommendations for the business entity based on the classifier ontology that links the data elements extracted for the business entity (the new business entity keywords, concepts, entities, and taxonomy classifications) to respective ones of the business class candidates to which they have highest confidence values of association (as determined at 110). Thus, the classifier autonomously identifies most likely or appropriate business class associations for data elements that are extracted from a variety data sources defining the business entity.

At 114 the configured processor reviews or audits the question-business class data classifications of the classifier built for the business entity, and at 116 corrects or otherwise revises the question-business class data classifications to eliminate errors identified at 114. At 116 the configured processor uses the corrections or revisions to the question-business class data classifications of the built classifier to provide feedback to further training of the data classification knowledge base ontology, wherein the data classification knowledge base ontology thereby "learns" and improves for future iterations of entity data analysis and classifier construction.

For example, in response to identifying an error in a data classification of a (first) question to one (a first) of the business class candidates within one (a first) of the question-business associations of the classifier built for the business entity at 114, at 116 the configured processor revises the classifier structure to delete a logical link of the first question to the first business class candidate, and to replace the deleted link with a new link of the first question to a second candidate of the business classes that has a next-highest confidence score of association to the extracted entity element of the first question. At 118 the configured processor further revises (trains) the knowledge base ontology to reflect the revision to the built classifier at 116.

Figure 5:
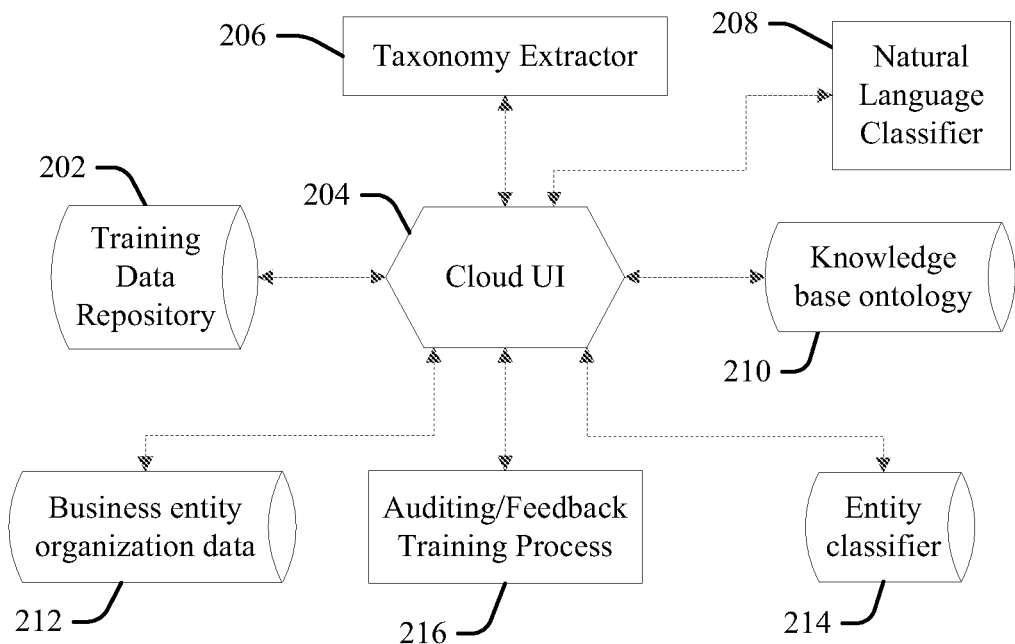
FIG. 5 is a block diagram illustration of another embodiment of the present invention.

FIG. 5 is a block diagram illustration of a system or process aspect of the present invention. A Cloud User Interface (Cloud UI) 204 uploads structured text business training data input from a training data repository 202 and uses a Taxonomy Extractor process 206 to extract (identify) training set data elements comprehending keywords, concepts, entities, and taxonomy classifications (as discussed with respect to 102, FIG. 4). The Cloud UI 204 is a set of services that enables to all the processes of the invention.

In one example the Taxonomy Extractor process 206 is "Natural Language Understanding," an IBM Watson™ collection of application programming interfaces (APIs) that identifies or understands concepts, entities, keywords, sentiment via analysis of input text data through natural language processing. (IBM and IBM WATSON are trademarks of the International Business Machines Corporation ("IBM") within the United States and other countries.) The Natural Language Understanding APIs provides a collection of text analysis functions that derive semantic information from input text content, and leverage sophisticated natural language processing techniques to generate high-level understanding of input content and obtain detailed insights, including sentiment for detected entities and keywords. Other aspects my use other natural language processing to define the Taxonomy Extractor process 206.

In the present example, the Cloud UI 204 utilizes another natural language processing resource, a Natural Language Classifier 208, to build the knowledge base ontology 210 that connects business classes within the training data to respected associated ones of the extracted training data elements as "questions" into a plurality of "question-business class" associations (as discussed with respect to 104 and 106, FIG. 4). In one example the Natural Language Classifier 208 is an IBM WATSON "Natural Language Classifier" service that applies deep learning techniques to make predictions about the best predefined classes for short text content that is less than a totality of the extracted training data elements (sentences, phrases, etc.) using machine learning algorithms to return the top matching (highest predicted values) of the pre-defined classes for short text inputs, wherein the Cloud UI 204 creates and trains to connect predefined classes to example texts so that the service can apply those classes to new inputs.

Thus, in response to input of the Business entity organization data 212, the Cloud UI 204 uses the Taxonomy Extractor process 206 to extract entity data elements (entity keywords, concepts, entities, and taxonomy classifications) from data defining a business entity organization (see 108 of FIG. 4) and to assign the business class candidates that are identified as associated with the extracted entity data elements as functions of strength of match to the question-business class associations (see 110, FIG. 4). The configured processor uses the Natural Language Classifier 208 to determine confidence values for the business classes candidates that represent respective strengths of matching to respective ones of the knowledge base ontology question-business class associations (see 111 of FIG. 4), and build the Entity classifier ontology 214 for the business entity that links the data elements extracted for the business entity to respective business class candidates to which they have highest confidence values of association (see 112 of FIG. 4).

An Auditing or feedback training process 216 provides feedback used by the Cloud UI 204 to review or audit the question-business class data classifications of the Entity classifier 214 (at 112, FIG. 4), wherein the results are used to correct or otherwise revises the question-business class data classifications of the Entity classifier ontology 214 (see 116, FIG. 4) and to further train or learn an improved knowledge base ontology 210 (see 118, FIG. 4).

Business data appropriate for processing and for extraction of keywords, concepts, entities, and taxonomy classifications, and for determining question-business class ontology structure associations with respective confidence value determined from strengths of matching, etc., for each of the training knowledge base and classifier ontologies, spans a wide variety of structured, semi-structured and unstructured data and associated metadata. Illustrative but not limiting or exhaustive examples includes business metadata, glossaries, catalogs business terms and descriptions, data classifications, data models, industry models, data mappings, data profiles, data samples, data lineage, business transformation rules, technical metadata and operational metadata.

Aspects extract keywords, concepts, entities, and taxonomy classifications from inputs of business terms and descriptions metadata that comprehends training entity names and descriptions and training entity names; information catalog business term relationships; business glossary abbreviations; column names and descriptions and target descriptions mapped to business terms within data mappings, data lineage and data models; attribute names and business terms derived from data profiling values (results); data sample values; data transformation rules. Thus, the ontologies are built to comprise question-business class nodes or elements that have questions selected from keywords, concepts, entities, taxonomy classifications, relationships, data transformation rules, data profiling values, sample values, column names; to which are each linked most relevant (highest confidence) respective ones of business classes selected from business term, entity name, attribute names, column names. Examples of ontology question-business class associations include the following examples provided in a (Question, Class) couplet format.

With respect to training information catalog input data business term descriptions and relationships metadata (including entity names, entity descriptions and business terms relationships), "Question: Business Term Descriptions; Class: Business Terms," examples include "Question: "The unique identifier assigned to an Involved Party" (Business Term Description); Class: "Involved Party ID" (Business Term)." An example of a "Question: Entity Descriptions: Class: Entity Names" is "Question: 'Involved Party identifies any Individual, group of Individuals, Organization, Organization Unit or Employment Position about which the Financial Institution wishes to keep information; for example Involved Party #124 (John Smith) Involved Party #432 (Financial Institution Xyz) Involved Party #453 (Financial Institution Xyz's Marketing Department) Involved Party #681 (Foreign Exchange Trader)' (Entity Description); Class: 'Involved Party" (Entity Name).' An example of a "Question: Entity Names; Class: Business Terms" is "Question: 'Involved Party' (Entity Name); Class: 'Involved Party ID' (Business Term)."

With respect to training information catalog input data, examples derived from information business terms, business term descriptions and relationships metadata include, an example of "Question: Business Term Descriptions; Class: Business Terms" is "Question: 'The unique identifier assigned to an Involved Party' (Business Term Description); Class: 'Involved Party ID' (Business Term)"; and for "Question: Relationships; Class: Business Terms," "Question: 'Customer Id=>Involved Party ID' (Relationships); Class: 'Involved Party ID' (Business Term)."

With respect to business glossary input data including business terms and abbreviations, an example for "Question: Abbreviations; Class: Business Terms" is "Question: 'IP_NM' (Abbreviation); Class: 'Involved Party Name' (Business Term)."

With respect to data mappings input data including column names, column name descriptions, target descriptions and business terms metadata, examples include, for a training "Question: Column Name Descriptions; Class: Business Terms", "Question: 'A unique number selected by the customer that uniquely identifies the customer' (Column Name Description); Class: 'Involved Party Id' (Business Term)"; for "Question: Target Descriptions; Class: Business Terms", "Question: 'Account number associated to a contract for a specific product' (Target Description); Class: 'Account Number' (Business Term)"; and for "Question: Column Names; Class: Business Terms," an example is "Question: 'AGCTAR' (Column Name); Class: 'Account Number' (Business Term)."

With respect to data profiling input data including attribute names, business terms and data profiling (results) metadata, examples include, for a training "Question: Data Profiling Values; Class: Attribute Names," Question: "CA, FL,NY,TX, . . . " (Data Profiling Values); Class: "ST_CD" (Attribute Name)"; and for a training "Question: Data Profiling Values; Class: Business Term," Question: "CA,FL,NY, TX, . . . " (Data Profiling Values); Class: "State" (Business Term).

With respect to data sample input data including attribute names, business terms and sample values metadata, examples include, for a training "Question: Sample Values; Class: Attribute Names," the example of "Question: "4100, 0653, 4265, 9867" (Sample Values); Class: "AGNRESP" (Attribute Name)"; and for the training "Question: Sample Values; Class: Business Terms," the example of "Question: "4100, 0653, 4265, 9867" (Sample Values); Class: "Branch Number" (Business Term)."

With respect to data lineage input data including column names and relationships, and column names and business terms relationships metadata, examples include, for a training "Question: Column Name; Class: Column Name," the example of "Question: "CUSTNO" (Column Name); Class: "CUSTID" (Column Name); and for the training "Question: Column Name; Class: Business Term," the example of "Question: "CUSTID" (Column Name); Class: "Customer Id" (Business Term."

With respect to data models input data including column names, column name descriptions and entity relationships metadata, examples include, for a training "Question: Column Name Descriptions; Class: Column Names," the example of "Question: "A unique number selected by the customer that uniquely identifies the customer" (Column Name Description); Class: "Customer Id" (Column Name); and for "Question: Entity Relationships; Class: Column Names," the example of "Question: "Employee ID=>Customer ID 1:1" (Entity Relationship); Class: "Customer Id" (Column Name)."

With respect to a data transformation rules input data of "Outstanding Amount=Σ installment Amount, or VLSDEV=Σ VLPARCE", examples of training questions include, for a training "Question: Data Transformation Rules; Class: Business Terms" example, "Question: "Σ installment Amount" (Data Transformation Rule); Class: "Outstanding Amount" (Business Term)"; and for "Question: Data Transformation Rules; Class: Attribute Names," an example is "Question: "Σ VLPARCE" (Data Transformation Rule); Class: "VLSDEV" (Attribute Name)."

Referring to the building and training of the classifier ontology for the new business entity as described with respect to FIG. 4, keywords, concepts, entities, taxonomies, column name descriptions, and column names are extracted from source metadata and used as "Question" inputs for classification via natural language processing, which provides classification association with levels of confidence. Thus, with respect to column names and column name descriptions metadata information, for a "Data Mapping & Classification—(Question)" format, the configured processor builds an alternative question structure "Question: Column Names or Question: Column Name Descriptions," for example "Question: "CUSTNO" (Column Name) or Question: A unique number selected by the customer that uniquely identifies the customer" (Column Name Description)".

With respect to column names and data profiling values (results) metadata information, for "Question: Column Names or Question: Data Profiling Values (Results)" examples include "Question: "ST_CD" (Column Name) or Question: "CA,FL,NY,TX, . . . " (Data Profiling Values)."

With respect to data sample metadata information (column names and sample values), examples for "Question: Column Names or Question: Sample Values" include "Question: "ST_CD" (Column Name) or Question: "CA,FL,NY, TX, . . . " (Sample Values)."

With respect to data lineage metadata information (column name relationships), examples for "Question: Column Names," examples include "Relationship: "CUSTNO"=>"CUSTID"; "Question: "CUSTNO" (Column Name) or Question: "CUSTID" (Column Name)."

With respect to data transformation rules metadata information (Example: VLSDEV=Σ VLPARCE), examples for a "Data Mapping & Classification—(Question)" format example of "Question: Data Transformation Rules; Question: Column Name" include "Question: "Σ VLPARCE" (Data Transformation Rule) and Question: VLSDEV (Column Name)."

Service providers desire innovative ways to leverage data, to be proactive in addressing customer and client needs. Aspects of the present invention provide an effective data lake structure and methodology that enables interface with a wide variety of diverse analytics ecosystems, providing key advantages in handling "big data," massive volumes of both structured and unstructured data that are so large as to be difficult to process using traditional database and software techniques. Coverage and accuracy of the trained and built knowledge bases increase over time with feedback and corrections provided by feedback data analysis mechanisms.

Prior art data lake management systems and methods often fail to meet client needs due to deficiencies in data governance: for example, in accurately identifying data processed as a function of type, or as a function of the identities of persons and entities having access to the data, or to enterprise data standards (reference data, data rules, etc.). To provide effective data governance, data in the aspects of the present invention properly classify data lake data and map it to the appropriate business terms contained in an enterprise-wide business glossary.

Organizations desire innovative ways to leverage data and be proactive in addressing their customer needs by implementing an effective data lake strategy to be able to generate analytics on all forms of data. A high number of prior art data lake initiatives are failing due to the lack of data governance resulting in a data swamp instead of a data lake. For an effective data governance, data in the data lake should be classified properly and mapped to the appropriate business terms contained in the enterprise-wide business glossary. Manually classifying all the input data sources is time consuming, error prone and there is currently no efficient mechanism to automate or semi-automate the data classification that spans the wide variety of structured, semi-structured and unstructured data that may define a given business entity. Without requisite metadata and classification, it may be impractical or unfeasible to find the best data source or attribute for a specific business use case and to have a successful data lake implementation. Aspects of the present invention provide a centralized information catalog that stores all metadata and classification information together with the services and/or processes that automatically or semi-automatically maintain the catalog, enabling a successful data lake implementation.

More particularly, the classifiers built by aspects of the present invention as a function of trained ontologies provide for a centralized information catalog structure that that stores metadata and classification information together, and wherein services and/or processes automatically or semi-automatically train and maintain the catalog on an ongoing-basis, enabling a robust and successful data lake implementation, reducing overall data mapping and classification by 60 to 70% over prior art, manual processes. Training/feedback processes provide continuous improvement on the coverage and the accuracy of the results as the total number of execution times of cognitive data classification tool iterations increases.

The classifier information also becomes available for consumption much faster relative to prior art methods, due to the automated data mapping classifications described herein. Metadata information also becomes available for consumption much faster via information metadata catalogs, allowing users to find and understand data from new data sources as a function of matching to the trained knowledge base ontologies. Success rates for data lake implementation increases via application of the automated data mapping classifications, wherein large loads of the metadata information within an information metadata catalog may be efficiently processed into entity classifiers that are useful for finding data within the input data, this avoiding the data swamp paradigm, The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a data classifier the method comprising executing on a computer processor:
   extracting from a structured text business data input, via natural language understanding processing, training set data elements that are selected from the group consisting of training keywords, training concepts, training entities, and training taxonomy classifications;
   identifying associations within the structured text business data of each of a plurality of business classes with respective ones of the extracted training set data elements, wherein the business classes comprise at least one of business terms, entity names, attribute names, and column names; and
   building a logical relationship data classification training knowledge base ontology that connects ones of the business classes to respective associated ones of the extracted training data elements as questions, into a plurality of knowledge base ontology question-business class associations.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the extracting the training set data elements, the identifying the associations within the structured training business data, and the building the logical relationship data classification training knowledge base ontology.

3. The method of claim 2, wherein the computer-readable program code is provided as a service in a cloud environment.

4. The method of claim 1, further comprising:
   extracting, via a natural language understanding process, a plurality of entity data elements from an entity business data input that defines an organizational attribute of a business entity, wherein the plurality of entity data elements are selected from the group consisting of entity keywords, entity concepts, constituent entities, and entity taxonomy classifications;

identifying candidates of the business classes that are likely associated with each of the entity data elements extracted for the business entity as functions of strength of match to the question-business class associations defining the knowledge base ontology;

determining confidence values for each of the business classes candidates that represent respective strengths of matching to respective ones of the knowledge base ontology question-business class associations; and building, via a natural language classifier process, a classifier ontology for the entity that links the extracted entity data elements to respective ones of the business class candidates to which they have highest confidence values of association; and wherein the entity business data input is selected from the group consisting of structured text data, semi-structured text data and unstructured text data.

5. The method of claim 4, further comprising:

identifying, via a feedback auditing process, an error in a data classification linking a first of the extracted entity data elements as a first question to a first of the business class candidates within the question-business class associations of the built classifier;

revising the built classifier structure to delete a logical link of the first question to the first business class candidate, and to replace the deleted link with a new link of the first question to a second candidate of the business classes that has a next-highest confidence score of association to the extracted entity element of the first question; and revising the knowledge base ontology to reflect the revision to the built classifier structure.

6. The method of claim 5, wherein the extracting the training set data elements from the structured text business data input via the natural language understanding processing comprises:

deriving semantic information from input text content; and using the natural language understanding processing to generate sentiment values for detected entities and keywords as a function of the derived semantic information.

7. The method of claim 6, the building the logical relationship data classification training knowledge base ontology further comprising:

connecting business classes within the structured text business data input to respected identified associated ones of the extracted training data elements as questions into a plurality of question-business class associations;

generating predictions with respect to best ones of the business classes for matching to short text content selections within the extracted training data elements, wherein the short text content selections are less than a totality of the extracted training data elements; and building the classifier ontology by selecting the business class candidates predicted as best ones for matching to the short text content selections as the ones of the business class candidates linked to the extracted entity data elements.

8. The method of claim 7, wherein the short text content selections are selected from the group consisting of a sentence of a plurality of text words, and a phrase of a plurality of text words.

* * * * *